March 17, 1925. 1,529,833

N. M. ESSICK

SINK STRAINER

Filed Nov. 12, 1923

INVENTOR
Nina M. Essick

Patented Mar. 17, 1925.

1,529,833

UNITED STATES PATENT OFFICE.

NINA M. ESSICK, OF CLEVELAND, OHIO.

SINK STRAINER.

Application filed November 12, 1923. Serial No. 674,143.

*To all whom it may concern:*

Be it known that I, NINA M. ESSICK, a citizen of the United States, residing at Cleveland, in the county of Cuyahoga and State of Ohio, have invented a certain new and useful Improvement in Sink Strainers, of which the following is a full, clear, and exact description, reference being had to the accompanying drawings.

This invention relates to culinary devices and has particular reference to an improved form of sink strainer.

The primary object of the present invention is to provide a portable sink strainer having perforated sides and bottom so as to permit the contents to drain in the usual manner and which shall also include a hinged imperforate bottom that may be folded back against the side wall of the strainer or positioned under the perforated bottom thereof and thus prevent solid matter and drippings from escaping while the device is being carried.

A further object is to provide a sink strainer of the aforesaid character which shall be exceedingly simple in construction and inexpensive to manufacture and which may be easily operated.

With these and other objects in view, the invention consists in the various novel features of construction and arrangement or combination, all of which will be fully described hereinafter and pointed out in the appended claims.

Figure 1:
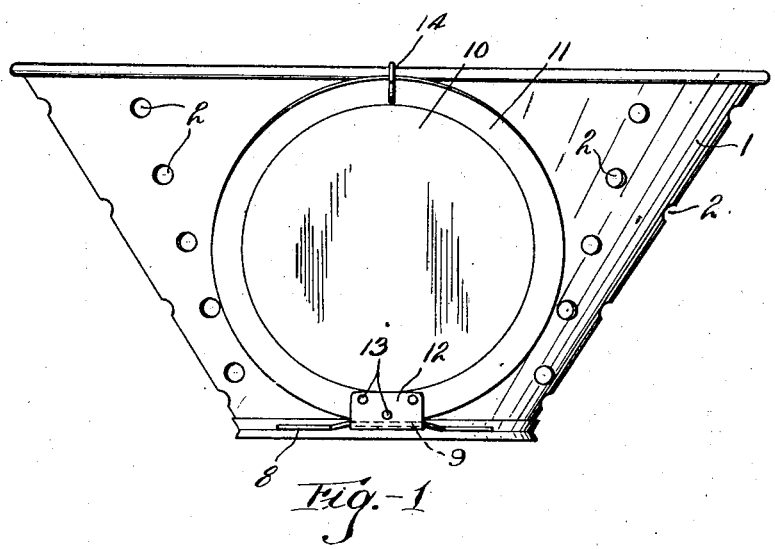
Figure 2:
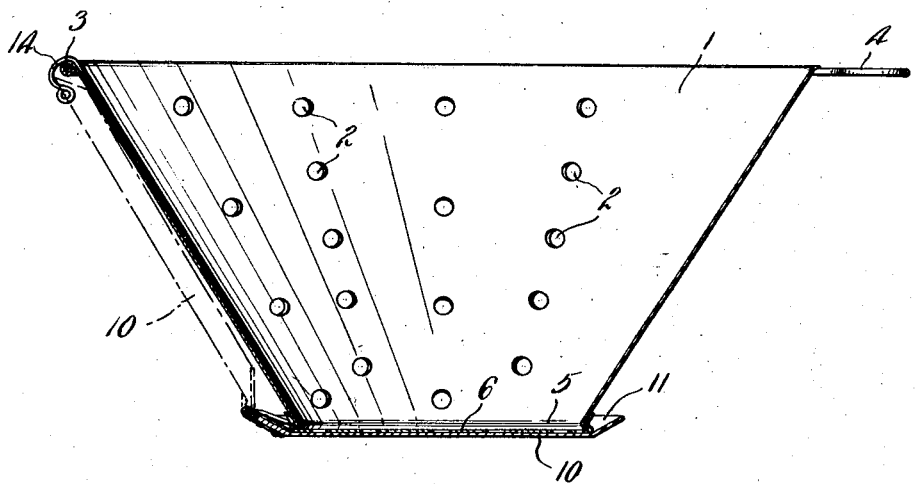
Figure 3:
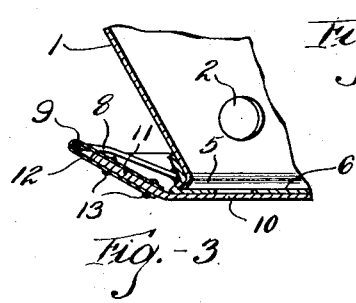

In the drawing accompanying and forming a part of this application, Fig. 1 is an elevation of a sink strainer constructed in accordance with my invention and showing the imperforate bottom folded back so that the refuse may drain into the sink or other convenient receptacle; Fig. 2 is a vertical sectional view showing the imperforate bottom in position so that the strainer may be carried without danger of the drippings escaping, and also indicating by dot-and-dash lines the position of the imperforate bottom when folded back; and Fig. 3 is an enlarged detail sectional view of the hinge connection for the imperforate bottom.

Describing the various parts by reference characters, 1 denotes the side walls of my sink strainer which may be conveniently formed from sheet metal to define any suitable shape, as for instance, an inverted frustrum of a cone. These walls are provided with a series of perforations 2 which permit the liquid in the refuse to drain freely therethrough, although I preferably omit such perforations in that portion of the wall, against which the imperforate bottom folds, as will be explained more fully hereinafter. The upper peripheral edge of the side walls may be folded over a wire 3 and such wire may be extended laterally to define a loop 4 which forms a convenient handle for carrying the strainer. The lower peripheral edge of the side walls is flared slightly as indicated at 5 and a perforated bottom 6 is fitted thereto in any suitable manner.

A wire 8 has each end thereof fastened adjacent the bottom edge of the strainer and the intermediate portion thereof is deflected upwardly and outwardly to define a pivotal support 9 for an imperforate bottom 10. This bottom is preferably shaped to fit the perforated bottom 6 of the strainer and the outer peripheral edge portion thereof is deflected upwardly as indicated at 11 to define a shallow receptacle. The imperforate bottom is hingedly attached to the wire support 9 by a sheet metal strap 12 which is folded about said wire and fastened by rivets 13 or other suitable fastening means to the flared edge 11 of the imperforate bottom.

A suitable latch 14 is fastened to the upper edge of the strainer so that when the imperforate bottom 10 is folded back against the side walls 1, as shown in Fig. 1 and indicated in dot-and-dash lines in Fig. 2, the bottom will be retained in this position and the strainer may be used in the usual manner to permit the liquid in the refuse to drain freely into the sink or other vessel.

The perforations being omitted in that portion of the side walls against which the imperforate bottom folds, it will be obvious that drippings cannot come in contact with the bottom. When it is desired to empty the strainer, the latch 14 may be released and the bottom 10 is then folded beneath the perforated bottom as shown in Fig. 2. The flared portion 11 of the bottom will catch any drippings which flow down the inclined side walls of the strainer and it will thus be apparent that the strainer may be carried safely without danger of liquid escaping.

Having thus described my invention, what I claim is:—

1. A sink strainer having side walls and a bottom each provided with perforations, an imperforate bottom hingedly connected to said strainer adjacent the bottom peripheral edge thereof, said last mentioned imperforate bottom being adapted to fold back against the side wall of said strainer or beneath said perforated bottom, the portion of said side wall against which said imperforate bottom folds being devoid of perforations, and means for retaining said bottom against said side wall.

2. A sink strainer having side walls and a bottom provided with perforations, a wire connected to said strainer adjacent the bottom thereof, said wire projecting outwardly from said strainer and defining a support, an imperforate bottom hingedly connected to said support, said imperforate bottom being adapted to fold back against the side wall of said strainer or beneath said perforated bottom, and a latch adjacent the upper edge of said strainer for retaining said bottom against said side wall.

In testimony whereof, I hereunto affix my signature.

NINA M. ESSICK.